Feb. 13, 1951           M. BONNET           2,541,954
PROCESS FOR PREPARING METALLIC SURFACES
FOR THE ENGRAVING THEREOF
Filed Oct. 30, 1945
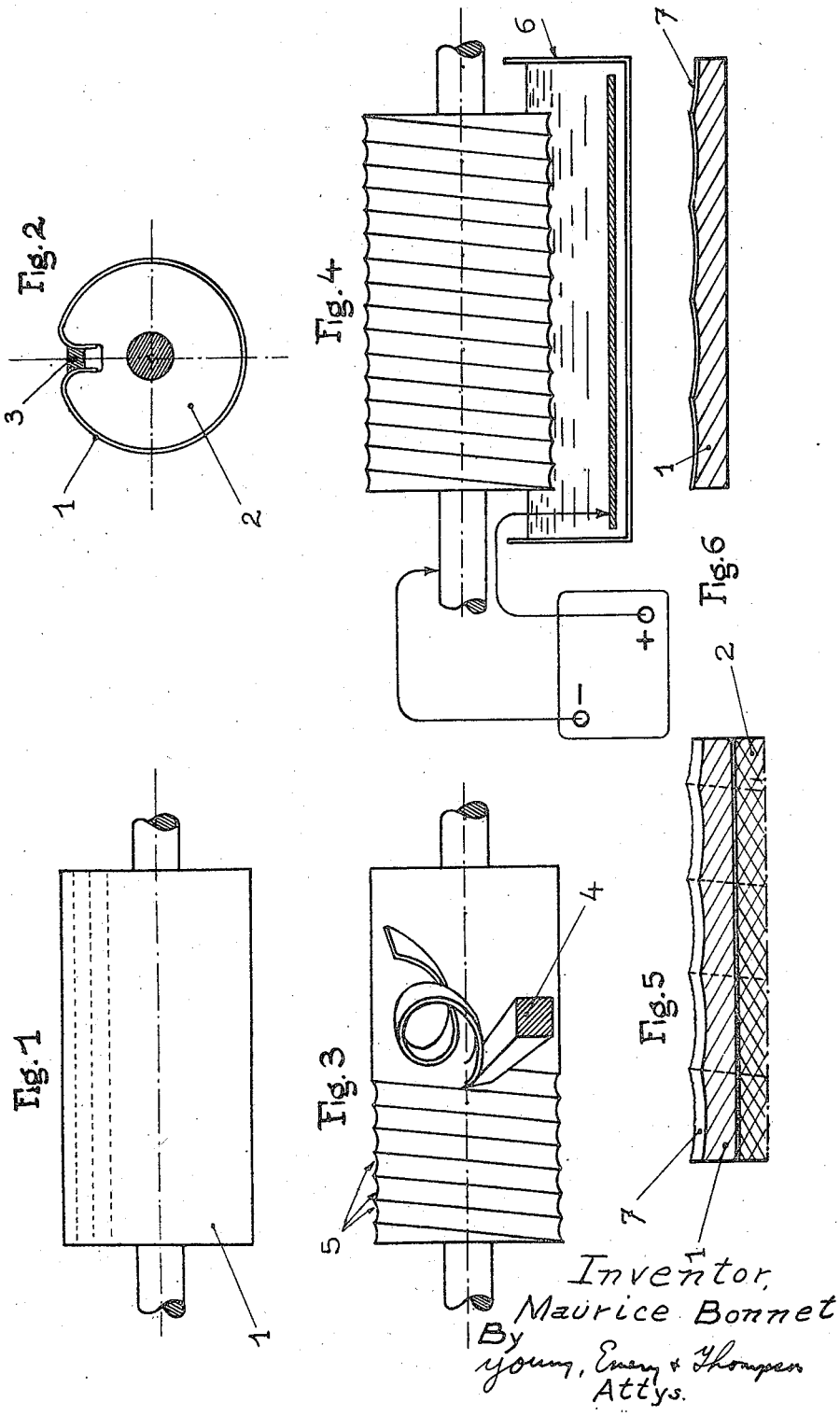
Inventor,
Maurice Bonnet
By Young, Emery & Thompson
Attys.

Patented Feb. 13, 1951

2,541,954

UNITED STATES PATENT OFFICE 2,541,954

PROCESS FOR PREPARING METALLIC SURFACES FOR THE ENGRAVING THEREOF

Maurice Bonnet, Paris, France, assignor to La Reliephographie, Societe pour l'Exploitation des Procedes de Photographie en relief Maurice Bonnet, Paris, France, a French corporation Application October 30, 1945, Serial No. 625,602
In France May 13, 1942

Section 1, Public Law 690, August 8, 1946
Patent expires May 13, 1962

4 Claims. (Cl. 204—29)

In some branches of technology (precision machines and optics for example) the problem is encountered of the necessity of very finely engraving metal surfaces, in order to form thereon a grating or network of lenticular elements, the width of which is of the order of a tenth, or even of a hundredth of a millimeter. These engravings necessitate extreme accuracy on the part of the machine for producing these engravings whilst the metal adapted to receive the engraving must have predetermined properties. In fact, in order that the engraving tool, (generally a diamond) operates under satisfactory conditions, the metal must be entirely pure, and of very fine grain.

I have already solved the difficulties inherent to the machine itself.

The present invention has for object a process for preparing metallic surfaces, so as to impart thereto all the desirable properties and particularly for preparing a mold for the molding of lenticular networks.

Extensive studies have led me to the conclusion that an electrolytic metal in the form of a very thin deposit and formed very slowly satisfies the required conditions. However in order that it may have the required characteristics, the speed of deposition is so slow that a homogeneous sheet of metal, sufficiently thick to be manipulated subsequently and used as matrix, cannot be obtained in practice.

According to the present invention, use is therefore made of a metal sheet available on the market. Said sheet is wound and stretched in a suitable manner around the horizontal work-carrying cylinder of an engraving lathe. The work thus horizontally mounted on an engraving machine is then subjected to the entire engraving operation, and consequently has the defects (traces of stripping and "chattering") inherent to the quality of the metal constituting the sheet.

After treatment in this manner, a very thin layer of "nascent" metal is deposited electrolytically on its surface, without removing it from the work-carrying cylinder, that is to say by including the latter in an electric circuit. The thin layer of deposited metal closely conforms to the already engraved surface and forms thereon a uniform extra thickness which fills up the irregularities resulting from the nature of the main metal forming the sheet.

The coated sheet is then subject to a light finishing operation which only acts on the electrolytically deposited layer.

The tool which only penetrates a pure metal of very fine grain, then exposes a very bright surface free from any trace of stripping.

Any tendency to "chatter" is eliminated by the fact that said tool although it only detaches a very thin layer or strip operates with a full cutting stroke, throughout its useful width, and consequently only removes a strip of uniform thickness in a groove which has already been hollowed out completely.

The accompanying drawings show solely by way of example, an illustration of the process above described. In said drawings, which are very diagrammatic and are not to scale, for greater clearness:

Figures 1 and 2 are front and side views of the sheet to be engraved, stretched around a work-carrying cylinder.

Figure 3 shows the same sheet whilst being engraved.

Figure 4 illustrates the setting up of an electrolytic bath on an engraving lathe.

Figure 5 shows in section and to an enlarged scale the electrolytic deposit formed on the sheet.

Figure 6 illustrates in the same manner the engraving finished and detached from the cylinder.

In Figures 1 and 2, 1 indicates the metal sheet to be engraved, 2, the work-carrying cylinder. The sheet 1 is stretched around the latter through the medium of any suitable means for example the device 3.

The engraving is entirely completed in the manner indicated in Fig. 3, by using a tool 4 which forms the grooves 5. The latter constitute the matrices of juxtaposed convergent cylindrical lenses.

As shown in Figure 4, the cylinder is then placed in a trough 6 containing the selected electrolytic bath, in which said cylinder and the engraving thereon are partly immersed. The deposit is effected by maintaining the cylinder continuously in rotation.

On the metal sheet 1 is thus formed a layer 7 of very pure nascent metal, indicated in Fig. 5. It will be seen that said layer 7, of uniform thickness, exactly conforms with the profile of the engraving.

During the finishing operations, which are then effected, the tool only removes a part of the thickness of said layer 7, as shown in Fig. 6. As described above the strip detached by said tool at each revolution is of uniform thickness and of constant width, which is of considerable importance for obtaining a cut or engraved surface having a high polish.

It will be understood that it would have been impossible to obtain this result if sheet 1 had been detached from the cylinder and coated electrolytically in a separate plating plant. Whatever precautions had been taken, the sheet would have presented, after having been remounted on the cylinder 2, an offsetting or excentricity considerably exceeding the very thin layer of electrolytic copper deposited in the manner indicated above. During the final engraving operation, the tool would then have unavoidably exposed some zones of the supporting metal.

*Example 1*

For the manufacture of optical selectors for peristereoscopy:

(1) On a copper sheet available on the market, 0.5 mm. thick, are engraved adjacent grooves 0.4 mm. wide and 0.03 mm. deep.

(2) A layer of copper the thickness of which is of about 0.01 mm. is then deposited on the engraving, under an intensity of 5 amperes, for 15 hours of electrolysis on the engraving lathe itself.

(3) Two or three finishing operations can then be carried out, detaching each time a strip about 0.002 mm. thick, without exposing the supporting metal.

The engraving thus obtained no longer has the surface defects which might have been noticeable after the first phase of the operation.

It will be understood that the preparation process which has just been described, by way of example, applied to a metal sheet wound on a cylinder in order to effect the engraving thereof, may also be applied in the case of a cylinder directly engraved, or in the case of a metal sheet engraved when flat.

Moreover the supporting metal need not necessarily be the same as the metal deposited electrolytically.

In the above example, the thin additional layer deposited on a copper sheet consisted of electrolytic copper, a metal which possesses all the properties of purity, fineness of grain and ductility for facilitating the action of the finishing tool.

The second example which will be indicated hereinafter precisely relates to the production of "two-metal" engravings of this character and the essential feature thereof consists in that the electrolytic finishing layer is formed by a metal which has the same qualities of purity and of fineness but is harder than the metal of the support and is preferably nonoxidizable. Provided a suitable tool is used, which is capable of carrying out a satisfactory cutting action in the thickness of the added metal, the finishing operations provide the engraving with the same qualities of polish as when applying the above-described method whilst, at the same time, the electrolytic layer acts as a protecting layer for the metal of the support, thus imparting to the finished engraving qualities of resistance to wear and of resistance to oxidation corresponding to those of the selected metal.

It is thus possible to omit the additional nickeling and chroming operations for hardening and protecting the engravings obtained according to the first example given.

The additional layer formed therefore serves a double purpose, viz.: it provides the "fine" metal in which the finishing operations are to be carried out; and it constitutes a reinforcement for the engraving which considerably increases the life of the latter.

*Example 2*

(1) A copper sheet available on the market is engraved in the same manner as stated in paragraph 1 of Example 1.

(2) Thereupon, instead of depositing a copper layer thereon, a thin layer of nickel is deposited electrolytically thereon.

(3) The finishing operations are then carried out in the manner indicated in paragraph 3, of Example 1.

The engraving thus completed has all the qualities of engravings obtained according to Example 1, but furthermore possesses the advantage that it has a hardness and a resistance to oxidation, as result of which it is possible to obtain therewith, by moulding, a much larger number of optical selectors.

Having now particularly described and ascertained the nature of my said invention and in what manner the same is to be performed, I declare that what I claim is:

1. A process for the manufacture of molds for the molding of lenticular networks consisting in horizontally mounting a cylinder on an engraving machine, engraving corresponding grooves by removing shavings from the surface of the cylinder, rotating the engraved cylinder without removal from the engraving machine in an electrolytic bath introduced under the cylinder, electro-depositing on the cylinder a layer of electrolytic metal of a thickness of about .01 mm., then subjecting the thus coated grooves to further engraving to effect a new removal of shavings not exceeding the thickness of the electrolytic layer.

2. A process for the manufacture of molds for the molding of lenticular networks consisting in stretching a sheet of metal about a cylinder horizontally mounted in an engraving machine, engraving grooves by removing shavings from the exterior surface of the sheet stretched on the cylinder, rotating the cylinder carrying the engraved sheet, without removing it from the engraving machine, in an electrolytic bath introduced under the cylinder, electro-depositing on the engraving surface of the sheet a layer of electrolytic metal of a thickness of about .01 mm., then subjecting the thus coated grooves to further engraving to effect a new removal of shavings not exceeding the thickness of the electrolytic layer.

3. A process for the manufacture of molds for the molding of lenticular networks consisting in stretching a sheet of copper about a cylinder horizontally mounted in an engraving machine, engraving grooves by removing shavings from the exterior surface of the sheet stretched on the cylinder, rotating the cylinder carrying the engraved sheet, without removing it from the engraving machine, in an electrolytic bath introduced under the cylinder, electro-depositing on the engraving surface of the sheet a layer of copper of a thickness of about .01 mm., then subjecting the thus coated grooves to further engraving to effect a new removal of shavings not exceeding the thickness of the layer.

4. A process for the manufacture of molds for the molding of lenticular networks consisting in stretching a sheet of copper about a cylinder horizontally mounted in an engraving machine, engraving grooves by removing shavings from the exterior surface of the sheet stretched on the cylinder, rotating the cylinder carrying the engraved sheet, without removing it from the engraving machine, in an electrolytic bath introduced under the cylinder, electro-depositing on the engraving surface of the sheet a layer of non-oxidizable electrolytic metal of a thickness of about .01 mm. then subjecting the thus coated grooves to further engraving to effect a new removal of shavings not exceeding the thickness of the layer.

MAURICE BONNET.

REFERENCES CITED

The following references are of record in the file of this patent:

UNITED STATES PATENTS

| Number | Name | Date |
| --- | --- | --- |
| 628,348 | McIlhiney | July 4, 1899 |
| 915,414 | Cowper-Coles | Mar. 16, 1909 |
| 1,813,669 | Hastings | July 7, 1931 |
| 1,880,632 | Wittel | Oct. 4, 1932 |
| 2,042,018 | Papst | May 26, 1936 |
| 2,048,578 | Van der Horst | July 21, 1936 |
| 2,243,608 | Schwaurte | May 27, 1941 |

OTHER REFERENCES

Physical Optics, by Robert W. Wood, 3d edition, 1936, page 266.